F. THORNTON, Jr.
CONTROL SYSTEM FOR ELECTRIC FURNACES.
APPLICATION FILED JUNE 29, 1918.
1,338,408.
Patented Apr. 27, 1920.
2 SHEETS—SHEET 1.
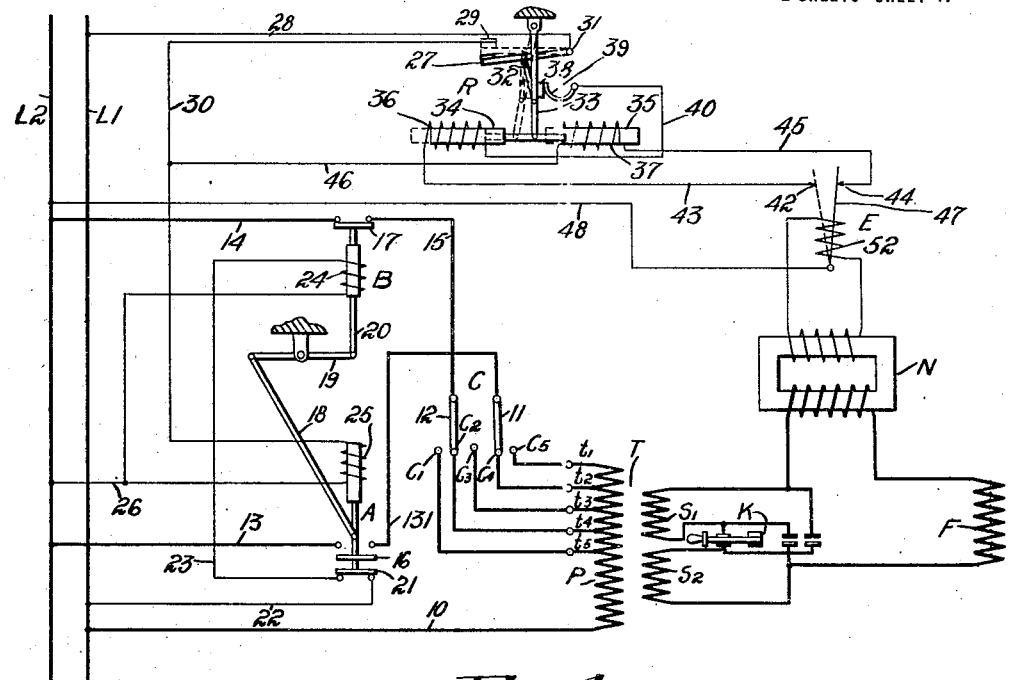
Fig:1.
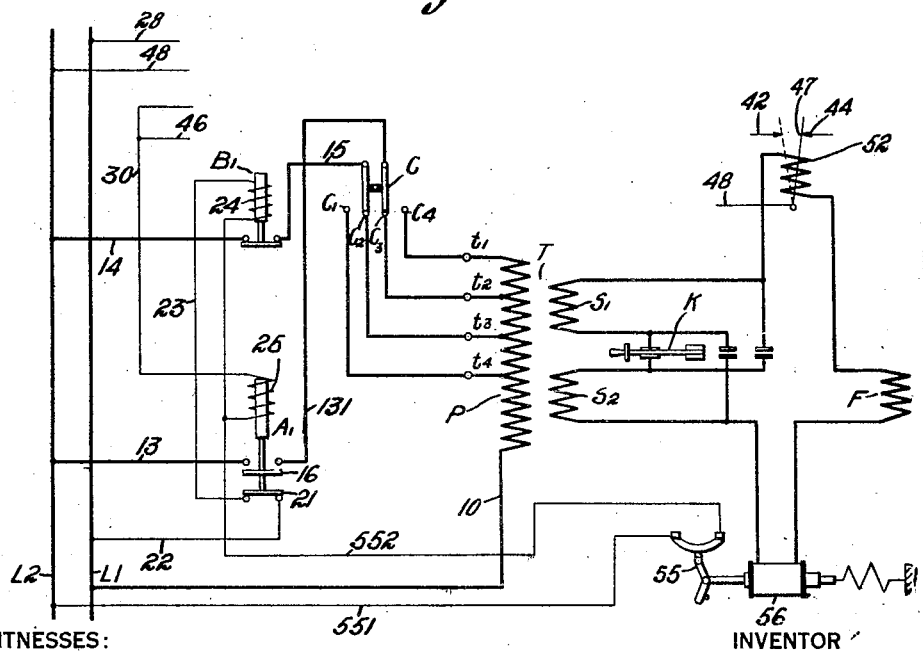
Fig:2.
WITNESSES:
J. F. Wurmb
E. L. Greenewald
INVENTOR
Frank Thornton Jr.
BY
Wesley G. Carr
ATTORNEY F. THORNTON, Jr.
CONTROL SYSTEM FOR ELECTRIC FURNACES.
APPLICATION FILED JUNE 29, 1918.
1,338,408.
Patented Apr. 27, 1920.
2 SHEETS—SHEET 2.
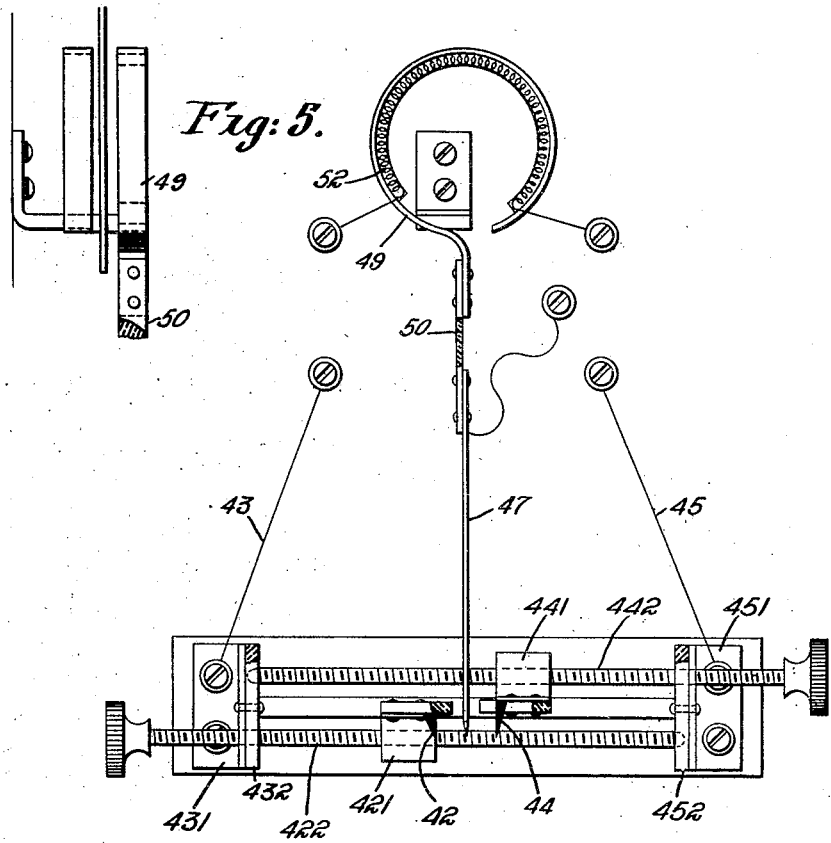
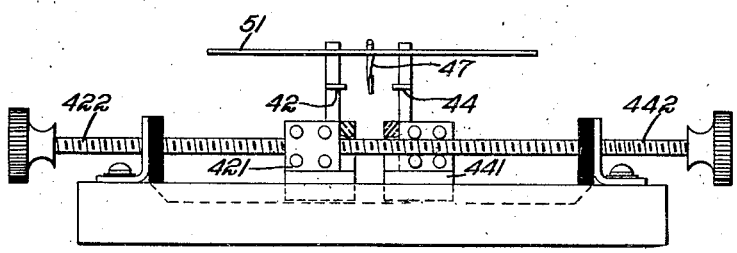
WITNESSES:
INVENTOR
Frank Thornton Jr.
BY
ATTORNEY

UNITED STATES PATENT OFFICE.

FRANK THORNTON, JR., OF MANSFIELD, OHIO, ASSIGNOR TO WESTINGHOUSE ELECTRIC & MANUFACTURING COMPANY, A CORPORATION OF PENNSYLVANIA.

CONTROL SYSTEM FOR ELECTRIC FURNACES.

1,338,408.  Specification of Letters Patent.  Patented Apr. 27, 1920.

Application filed June 29, 1918. Serial No. 242,626.

*To all whom it may concern:*

Be it known that I, FRANK THORNTON, Jr., a citizen of the United States, and a resident of Mansfield, in the county of Richland and State of Ohio, have invented a new and useful Improvement in Control Systems for Electric Furnaces, of which the following is a specification.

This invention relates to a temperature-control system and it has particular reference to a system for controlling the temperature of an electric-resistance furnace, the resistor of which consists of a material that has a negative temperature-resistance coefficient.

The principal object of the invention is to automatically vary the voltage of the current supplied to a furnace in accordance with variations in the temperature of the furnace.

Another object of the invention is to supply current to the furnace through a transformer, the primary turns of which are variable so as to avoid the use of resistances in the main circuit when varying the voltage of the current supply.

Another object of the invention is to provide a system that utilizes a thermostat having a thermal element heated by a current that is proportional to the current fed to the furnace, whereby the response of the movable element of the thermostat will be proportional to the temperature of the furnace.

Another object of the invention is to provide a control system in which the movable element of the thermostat directly controls the relay mechanism which, in turn, controls the circuits of electromagnetically-operable switches which determine the number of turns of the primary winding connected to the source to supply current to the furnace.

The above and other objects and the novel features of the invention will be apparent from the following description, taken in connection with the drawing in which Figure 1 is a diagram of a furnace temperature-controlling system embodying my invention; Fig. 2 is a similar view, slightly modified; Fig. 3 is a plan view of a thermostat used in the system of my invention; Fig. 4 is an end view of the thermostat, and Fig. 5 is an edge view of a portion of the thermostat.

The control system disclosed is utilized for the purpose of regulating and controlling the temperature of a resistance-type electric furnace in which F of Fig. 1 designates the resistor or current-consuming means. In the particular furnace disclosed, the resistor F consists of material, such as carborundum, which has a negative temperature-resistance coefficient. The resistor F is connected in circuit with the secondary winding of a transformer T, the secondary winding being arranged in two sections $S_1$ and $S_2$, which may be connected either in series or in parallel with the resistor by a double-throw series-parallel switch K.

The primary winding P of the transformer has one end thereof connected to the current supply main $L_1$ by a conductor 10, and a series of taps $t_1$, $t_2$, $t_3$, $t_4$, and $t_5$ are connected to contacts $c_1$, $c_2$, $c_3$, $c_4$ and $c_5$ of a change-over switch C. The change-over switch C has two switch members 11 and 12 movable over the contacts $c_1$, $c_2$, $c_3$, $c_4$ and $c_5$ to select the voltage limits on the transformer winding P between which the furnace is to be operated, the number of effective turns of the winding being increased or decreased by adjusting members 11 and 12 and selecting the range of voltage desired.

The supply of current to the change-over switch C from the supply main $L_2$ is controlled by two electromagnetically operated line switches A and B. One of the line switch contacts of the switch A is connected to the supply main $L_2$ by the conductor 13 and the other switch contact is connected to the change-over switch member 11 by the conductor 131. The line switch contacts of the switch B are connected to the supply main $L_2$ and the change-over switch member 12 by the conductors 14 and 15, respectively. The movable switch elements 16 and 17, respectively, of the switches A and B are mechanically interlocked by some suitable means, such as links 18, 19 and 20, so that, when one of the switches is closed to connect the supply main $L_2$ to the primary winding P, the other switch will be open to prevent a short circuit through certain of the turns of the primary winding. The switch B is also electrically interlocked with the switch A since the switch member 21 of the switch A coöperates with contacts connected to the conductors 22 and 23 to control the supply of current to the operating magnet 24 of the switch B. The other terminal of the winding of the operating magnet 24 and one terminal of the winding of the operating magnet 25 of the switch A are connected, by a conductor 26, to the supply main $L_2$.

The mechanism for operating the switches A and B in accordance with the temperature changes in the furnace resistor F comprises a relay and switch mechanism R and a thermostatic device E, the latter controlling the operation of the relay mechanism R which, in turn, controls the operation of the switch A and that of the switch B interlocked with the switch A. The relay and switch mechanism R comprises a pivoted switch member 27 connected to the supply main $L_1$, by a conductor 28 and having a stationary contact 29 connected by a conductor 30 to one terminal of the operating coil 25. The switch member 27 is pivoted at 31 and is supported between its pivot and the free end that carries its contact by a link 32 that extends downwardly and is pivoted to a suspended arm 33 the lower end of which is pivotally connected to the plungers 34 and 35 of the oppositely disposed solenoids or relays 36 and 37, respectively. The arm 33 also carries a contact 38 that is engageable by the resilient contact 39 which is connected, by a conductor 40, to one terminal of the solenoid winding 36. The other terminal of the winding 36 is connected to a stationary thermostat contact 42 by a conductor 43, and the other stationary thermostat contact 44 is connected to one terminal of the solenoid winding 37 by a conductor 45. The other terminal of the solenoid winding 37 is connected, by a conductor 46, to the conductor 30. When the switch 27 is closed by the energization of the winding 36, it and the parts connected to it will be moved into the positions indicated in dotted lines in Fig. 1 and will be held there until such time as the winding 37 is energized, since the connecting link 32 will be swung to such position that its upper end will be thrown past the center and be inclined in a direction opposite to that in which it is inclined in the open position.

The energization of the windings 36 and 37 depends upon the position of a pivoted element 47 connected by a conductor 48 to the supply main $L_2$ and having a contact and current-carrying part that moves between the contacts 42 and 44 and makes contact with the one or the other of them.

The construction of the thermostatic element E is more fully disclosed in Figs. 3, 4 and 5 wherein the movable element 47 is shown connected to, but insulated from, a bimetallic temperature-responsive member 49 by a bar 50. The contacts 42 and 44 are carried by blocks 421 and 441 having screw-threaded connection with adjusting screws 422 and 442, respectively, whereby the contacts 42 and 44 may be independently adjusted. The screw-threaded spindle 422 carries current from the conductor 43 through the bracket 431 to the block 421 upon which the contact 42 is mounted, and similarly, the spindle 442 carries current through the bracket 451 to the block 441 upon which the contact 44 is mounted. The spindles 422 and 442 are also supported by plates 452 and 432 which insulate them, respectively, from each other. A suitably graduated scale 51 may be provided to assist in properly setting the contact members 42 and 44. The bimetallic member 49 is of approximately annular form and may consist of a strip of brass and a strip of steel secured together. One end of the member 49 is fixed and the end attached to the bar 50 is movable in response to variations produced by an electric heating coil 52 located within, and adjacent to, the member 49. The heating coil 52 receives current proportional to the current flowing to the resistor F from the series transformer N in the secondary circuit of the transformer T. Since the resistor F has a negative temperature-resistance coefficient, an increase of the temperature of the resistor F will cause a decrease of its electrical resistance and permit more current to flow in the secondary circuit. This increase in current will result in an increase in the heating effect of the heating coil 52 and thus cause a movement of the element 47 that is proportional to the increase of the temperature of the resistor F. Accordingly, the range of temperatures to be obtained in the operation of the furnace may be determined by setting the contacts 42 and 44, which will cause the operation of the relay mechanism R and line switches A and B to change the voltage of the current supplied to the secondary of the transformer T whenever desired.

The operation of the system shown in Fig. 1 is briefly as follows: In starting, the switches A and B are in the positions indicated and, by setting the members 11 and 12 of the change-over switch C, the range of voltages may be selected. In starting, the series-parallel switch is thrown to a position to connect the sections $S_1$ and $S_2$ in series. The current will then be supplied through the switch B to a section of the primary winding comprising the lowest number of turns, whereby the ratio of transformation will be about one to one and full line voltage will be applied to the resistor of the furnace to quickly heat the same. As current flows to the furnace and it begins to heat, the movable element 47 of the thermostat leaves the contact 44 and finally reaches the contact 42 when the upper extreme operating temperature is reached, whereupon switch 27 is closed, and the switch A is operated. The operation of the switch A opens the switch B and connects a greater number of turns of the primary winding in circuit with the source of current supply, reducing the voltage applied to the resistor F. The furnace, of course, continues to be heated but the temperature thereof gradually decreases and, should it fall below a predetermined lower limit, the current flowing through the heater 52 will correspondingly decrease and finally the movable element 47 will close the circuit of the relay coil 37 and cause the switch 27 to be opened. This breaks the circuit of the operating coil 25, releasing the switch A and closing the circuit of the operating coil 24 to again apply a higher voltage to the resistor F to increase the temperature of the furnace. It will be seen that the operation of the mechanism is automatic throughout and will apply to the furnace one of the two different voltages determined by the setting of the change-over switch C.

In Fig. 2, I have illustrated a similar system of furnace control except that, in this system, the mechanical interlock between the two line switches A' and B' is omitted and an overload limiting circuit breaker 55 is connected in the circuit between the supply main L₂ and the operating coils 25 and 24 of the switches A and B. The actuating coil 56 of the overload circuit breaker 55 is connected in series with the secondary winding of the transformer T and the resistor F and will release the switches A and B, if an excessive current flows through the resistor of the furnace. In Fig. 2, I have also shown the heating coil of the thermostat connected in series with the resistor and secondary of the transformer T.

While I have shown and described the control system in detail, it is to be understood that certain changes may be made therein by those skilled in the art without departing from the spirit of the invention and, therefore, I do not wish to be limited except as defined by the appended claims.

I claim as my invention:

1. In a control system, the combination with an electric supply circuit including a transformer, and a current-consuming device in circuit with the secondary winding of said transformer, of means for controlling the electricity supplied to said device, said means comprising a thermostat and mechanism controlled by said thermostat for varying the ratio of transformation of said transformer.

2. In a control system, the combination with an electric supply circuit including a transformer, and a current-consuming device in circuit with the secondary winding of said transformer, of means for controlling the current supplied to said device, said means comprising a thermostat having an element operable in response to variations of the current supplied to said device and relay mechanism in circuit with said thermostat and controlling the number of effective turns in the primary winding of the transformer.

3. In a control system, the combination with an electric supply circuit including a resistor, of means for varying the current supplied to said resistor, said means comprising a plurality of line switches and means comprising an electrically - heated thermostat responsive to changes in the resistance of said resistor for controlling the action of said switches.

4. In a control system, the combination with an electric supply circuit including a current-consuming device, of means for varying the current supplied to said device, said means comprising a plurality of electrically-operable line switches and means comprising a thermostat and relay mechanism in circuit with said thermostat and also in circuit with the switch operating means for automatically controlling the action of said switches.

5. In a temperature system, the combination with an electric supply circuit including a transformer, current-consuming means connected to the secondary winding of the transformer, and a device responsive to variations in the flow of current in said secondary circuit, of electrically-operable means for controlling the current supplied to the primary winding of said transformer, and a relay mechanism controlled by said device and controlling said electrically - operable means.

6. In a furnace-control system, the combination with a current-consuming means, of means for supplying current thereto, comprising a transformer, means for varying the primary and secondary windings of said transformer to change the voltage applied to said consuming means and means responsive to variations in the consuming means for automatically controlling the operation of the varying means of one of said windings.

7. In a temperature-control system, the combination with a current-consuming device, of means for maintaining the voltage of the current supplied to said device between two predetermined limits, said means comprising a thermal-responsive means, a relay mechanism controlled by said thermal-responsive means and a switch mechanism in the supply circuit, said switch mechanism being controlled by said relay mechanism.

8. In a temperature-control system, the combination with a current - consuming means, of means for controlling the voltage of the current supplied to said current-consuming means comprising a transformer having its secondary winding connected to said current-consuming means, a changeover switch adapted to be connected to the primary winding of said transformer and adapted to select the voltage limits between which the furnace is to operate, and electrically-operable switch mechanism adapted to connect the source of current to said changeover switch.

9. In a furnace-control system, the combination with an electric supply circuit including a transformer, a resistor and an overload relay connected to one of the windings of said transformer, and a device responsive to variations in the flow of current in said circuit, of switch mechanism controlled by said device for controlling the ratio of transformation of said transformer.

10. In a furnace-control system, the combination with a current-consuming means, of a transformer having its secondary winding connected to said current-consuming means, and means for controlling the number of turns of the primary winding connected to the source of current comprising a plurality of interlocked switches and thermally operable means responsive to variations in the condition of the current-consuming means for controlling the operation of said interlocked switches.

11. In a control system, the combination with a current-consuming means, of a transformer having its secondary winding connected to said current-consuming means, means for varying the number of turns of the primary winding that are connected to the source of current comprising two line switches, one of said line switches being adapted to connect a larger number of turns to the source of current than the other, and means for controlling the line switches comprising a member responsive to the condition of said current-consuming device, a relay mechanism controlled by said member and controlling the operation of said line switches.

12. In a control system, the combination with a current-consuming means, of means for controlling the supply of current to said consuming means comprising interlocked line switches, a relay mechanism and another switch controlled by said relay mechanism and controlling the circuit of the operating means of one of said line switches.

13. In a furnace-control system, the combination with a current-consuming means, of means for controlling the supply of current thereto comprising electrically-operable line switches, a movable element associated with said current-consuming means, said element being limited in its movement between two points, another switch in circuit with the operating means of one of said line switches, and a relay mechanism for operating said other switch and controlled by the movable element, said relay mechanism being adapted to operate and close said other switch in one extreme position of said movable element and to maintain the switch in closed position until the movable element reaches the other extreme position of its movement.

14. In a furnace-control system, the combination with a resistor, of means for supplying current thereto, said means comprising a transformer having a secondary winding connected to the resistor and a primary winding adapted to be connected to the source of current, and a plurality of switches for controlling the number of turns of the primary winding connected to the source of current, said switches being mechanically and electrically interlocked, and means comprising a device operable in response to changes in the temperature of the furnace for controlling the action of said switches.

15. In a furnace-control system, the combination with a resistor having a negative temperature-resistance coefficient, of means for controlling the supply of electric energy thereto, said means comprising a thermostat having a movable thermal element and electric heating means associated with said resistor and said element and adapted to heat said element in proportion to the current flowing through said resistor.

16. In a temperature-control system, the combination with a resistor, of means for controlling the supply of electric energy thereto, said means comprising a thermostat outside of the thermal influence of said resistor, switch mechanism controlling the flow of current to the resistor, and relay mechanism controlling said switch mechanism and controlled by said thermostat.

17. A thermostat comprising a pair of contacts, means for independently adjusting said contacts comprising threaded spindles, a movable contact adapted to engage either of said contacts, a thermal element connected to said movable contact device, and an electric heating coil associated with said thermal element.

In testimony whereof, I have hereunto subscribed my name this 20th day of June, 1918.

FRANK THORNTON, Jr.